(12) United States Patent
Rambo (10) Patent No.: US 7,954,124 B2
(45) Date of Patent: May 31, 2011

(54) SYSTEM AND METHOD FOR SIMULTANEOUSLY DISPLAYING VIDEO PROGRAMMING AND INSTANT MESSAGING

(75) Inventor: Kenneth Rambo, Denver, CO (US)

(73) Assignee: Quest Communications International, Inc., Denver, CO (US)

( * ) Notice: Subject to any disclaimer, the term of this patent is extended or adjusted under 35 U.S.C. 154(b) by 1098 days.

(21) Appl. No.: 10/853,339

(22) Filed: May 24, 2004

(65) Prior Publication Data

US 2005/0091694 A1 Apr. 28, 2005

Related U.S. Application Data

(63) Continuation of application No. 10/671,312, filed on Sep. 24, 2003.

(51) Int. Cl.
*H04N 5/45* (2011.01)
(52) U.S. Cl. .......................................... 725/43; 725/40
(58) Field of Classification Search ................ 725/40, 725/43

See application file for complete search history.

(56) References Cited

U.S. PATENT DOCUMENTS

| | | | |
|---|---|---|---|
| 4,953,159 A * | 8/1990 | Hayden et al. ............... 370/265 |
| 5,594,794 A | 1/1997 | Eyer et al. |
| 6,081,830 A * | 6/2000 | Schindler ..................... 709/204 |
| 6,144,998 A * | 11/2000 | Pisterzi ........................ 725/109 |
| 6,233,389 B1 | 5/2001 | Barton et al. |
| 6,412,112 B1 | 6/2002 | Barrett et al. |
| 6,493,703 B1 * | 12/2002 | Knight et al. ................... 707/3 |
| 6,530,082 B1 * | 3/2003 | Del Sesto et al. ................ 725/9 |
| 6,597,785 B1 | 7/2003 | Burke et al. |
| 6,731,308 B1 | 5/2004 | Tang et al. |
| 6,757,365 B1 | 6/2004 | Bogard |
| 6,889,321 B1 | 5/2005 | Kung et al. |
| 6,968,364 B1 | 11/2005 | Wong et al. |
| 7,143,428 B1 * | 11/2006 | Bruck et al. ................... 725/37 |
| 7,146,629 B2 | 12/2006 | Tsukada et al. |
| 7,269,162 B1 | 9/2007 | Turner |
| 7,484,236 B2 | 1/2009 | Alao et al. |
| 7,603,683 B2 | 10/2009 | Reto |
| 7,788,692 B2 | 8/2010 | Rambo |
| 2002/0046407 A1 | 4/2002 | Franco |
| 2002/0057335 A1 | 5/2002 | Tsukada et al. |
| 2002/0124247 A1 | 9/2002 | Houghton |
| 2002/0178441 A1 | 11/2002 | Hashimoto |
| 2002/0184634 A1 | 12/2002 | Cooper |

(Continued)

OTHER PUBLICATIONS

U.S. Appl. No. 10/839,987, Office Action dated May 6, 2009, 15 pgs.

(Continued)

*Primary Examiner* — John W Miller
*Assistant Examiner* — Oschta Montoya (57) ABSTRACT

Instant messaging (IM) and TV programming are displayed simultaneously on a TV screen. An instant messaging window on the screen displays posted messages and identifies the TV program (if any) being currently viewed by each user posting messages. An icon accompanying a message can be selected by a message recipient to permit a telephone call to be automatically dialed and completed to the message sender. Video files attached to sent messages include a key which may be compared to a key at the destination, so that the video file may be viewed by the recipient only if the there is a match. Data collected at a server managing the instant messaging may be used to monitor message, television and telephone activity, as well as demographic data associated with the IM users.

19 Claims, 10 Drawing Sheets

U.S. PATENT DOCUMENTS

| | | | |
|---|---|---|---|
| 2002/0188777 A1* | 12/2002 | Kraft et al. | 710/100 |
| 2003/0084449 A1 | 5/2003 | Chane et al. | |
| 2003/0120734 A1 | 6/2003 | Kagan et al. | |
| 2003/0126207 A1 | 7/2003 | Creamer | |
| 2004/0128183 A1 | 7/2004 | Challey et al. | |
| 2005/0066362 A1 | 3/2005 | Rambo | |
| 2005/0066363 A1 | 3/2005 | Rambo | |
| 2005/0066364 A1 | 3/2005 | Rambo | |
| 2005/0160282 A1 | 7/2005 | Hirata | |
| 2007/0124795 A1* | 5/2007 | McKissick et al. | 725/135 |

OTHER PUBLICATIONS

U.S. Appl. No. 10/839,884, Office Action dated Apr. 30, 2009, 12 pgs.
U.S. Appl. No. 10/671,312, Office Action dated Nov. 1, 2007, 11 pgs.
U.S. Appl. No. 10/671,312, Final Office Action dated Apr. 3, 2008, 16 pgs.
U.S. Appl. No. 10/671,312, Advisory Action dated Jun. 25, 2008, 3 pgs.
U.S. Appl. No. 10/671,312, Office Action dated Jul. 21, 2008, 17 pgs.
U.S. Appl. No. 10/671,312, Final Office Action dated Jan. 6, 2009, 12 pgs.
U.S. Appl. No. 10/671,312, Advisory Action dated Mar. 13, 2009, 3 pgs.
U.S. Appl. No. 10/671,312, Office Action dated Jun. 11, 2009, 16 pgs.
U.S. Appl. No. 10/671,312, Final Office Action dated Dec. 22, 2009, 14 pgs.
U.S. Appl. No. 10/840,026, Office Action dated Sep. 18, 2008, 15 pgs.
U.S. Appl. No. 10/840,026, Final Office Action dated Mar. 2, 2009, 10 pgs.
U.S. Appl. No. 10/840,026, Advisory Action dated Apr. 20, 2009, 3 pgs.
U.S. Appl. No. 10/840,026, Office Action dated Jul. 20, 2009, 12 pgs.
U.S. Appl. No. 10/839,884, Office Action dated Jan. 11, 2008, 12 pgs.
U.S. Appl. No. 10/839,884, Final Office Action dated Jun. 25, 2008, 16 pgs.
U.S. Appl. No. 10/839,884, Advisory Action dated Sep. 8, 2008, 3 pgs.
U.S. Appl. No. 10/839,884, Office Action dated Oct. 27, 2008, 12 pgs.
U.S. Appl. No. 10/839,884, Final Office Action dated Apr. 30, 2009, 16 pgs.
U.S. Appl. No. 10/839,884, Advisory Action dated Jul. 27, 2009, 3 pgs.
U.S. Appl. No. 10/839,884, Examiner's Answer to Appeal Brief dated Nov. 24, 2009, 22 pgs.
U.S. Appl. No. 10/839,987, Office Action dated Jan. 23, 2008, 18 pgs.
U.S. Appl. No. 10/839,987, Final Office Action dated Jun. 12, 2008, 14 pgs.
U.S. Appl. No. 10/839,987, Advisory Action dated Aug. 18, 2008, 3 pgs.
U.S. Appl. No. 10/839,987, Office Action dated Nov. 6, 2008, 15 pgs.
U.S. Appl. No. 10/839,987, Final Office Action dated May 6, 2009, 18 pgs.
U.S. Appl. No. 10/839,987, Advisory Action dated Jul. 21, 2009, 3 pgs.
U.S. Appl. No. 10/839,987, Office Action dated Sep. 30, 2009, 14 pgs.
U.S. Appl. No. 10/671,312, Advisory Action dated Mar. 1, 2010, 3 pgs.
U.S. Appl. No. 10/840,026, Final Office Action dated Mar. 9, 2010, 14 pgs.
U.S. Appl. No. 10/671,312, Office Action dated May 4, 2010, 17 pgs.
U.S. Appl. No. 10/839,987, Notice of Allowance dated May 14, 2010, 6 pgs.
U.S. Appl. No. 10/839,987, Supplemental Notice of Allowance dated Jun. 29, 2010, 4 pgs.
U.S. Appl. No. 10/671,312, Final Office Action dated Oct. 6, 2010, 22 pgs.
U.S. Appl. No. 10/840,026, Office Action dated Nov. 10, 2010, 12 pgs.

* cited by examiner

TV Show A

| Time | No. of Users | Viewers | Trend | Mail Activity | Phone Activity |
|---|---|---|---|---|---|
| 8:15PM | 5,432 | 3,210 (59%) | Up | High | High |

FIG. 12

SYSTEM AND METHOD FOR SIMULTANEOUSLY DISPLAYING VIDEO PROGRAMMING AND INSTANT MESSAGING

BACKGROUND OF THE INVENTION

Instant messaging has become a popular forum for exchanging messages and information among computer users. While popular, it has some drawbacks. For example, the instant messaging screen used for sending and receiving information typically identifies the person posting any message next to his/her message, but it may not reveal other conditions pertaining to the message or its sender. For example, if the sender is engaged in a second activity (such as watching a TV program) at the same time as sending and receiving instant messages, the recipient may not know about the second activity unless told by the sender as part of the message.

Currently available instant messaging (IM) applications have other characteristics that limit their use as a complete form of communications. For example, while it may be possible to initiate a voice conversation as part of the IN application, such voice communications are implemented using a communication channel established by an IM server over the internet. Each user must have the proper software and hardware for participating in the voice communications. Such communications may not use conventional telephones and the PSTN (public switched telephone network).

Also, while it is known for people using email and instant messages to send attachments with their messages, there can be problems surrounding the attachments. For example, if the sender attaches a video clip of a TV program or movie, the recipient may or may not be a subscriber to the service (e.g., premium cable TV channel) from which the video clip was obtained.

Further, while IM applications have the capability of collecting data concerning those sending and receiving messages, there has not existed a convenient manner of collecting that data and using it for purposes of understanding the habits or needs of users.

BRIEF SUMMARY OF THE INVENTION

There is provided, in accordance with the present invention, a display system for use in a communications network, the display system having a display device, and plural display windows at the display device, the plural windows for simultaneously displaying multiple content to a viewer, wherein a first display window displays video programming content and wherein a second display window displays content from an instant messaging application.

In another embodiment, the video programming content is a broadcast television program provided to the viewer over one of a plurality of selectable television channels and wherein the instant messaging content includes a program ID for identifying the broadcast television program being viewed by instant messaging (IM) users.

In another embodiment, the instant messaging content further includes a selectable telephone communications element, and wherein a telephone communications line is established over the communications network between the viewer (the user at the display system) and a remote IM user having his or her personal ID displayed as part of the instant messaging content, when the telephone communications element is selected by the viewer.

In yet another embodiment of the invention, the viewer is a subscriber to video programming content received over the communications network, the viewer is assigned one or more security keys in order to display the video programming content, an electronic message sent by the viewer to a remote IM user includes a video data file attachment obtained from the video programming content, the video data file includes a security key associated with the video programming content, and the video data file is displayed for the IM user only if that user has a security key matching the security key associated with the video programming content.

DETAILED DESCRIPTION OF THE INVENTION

Figure 1:
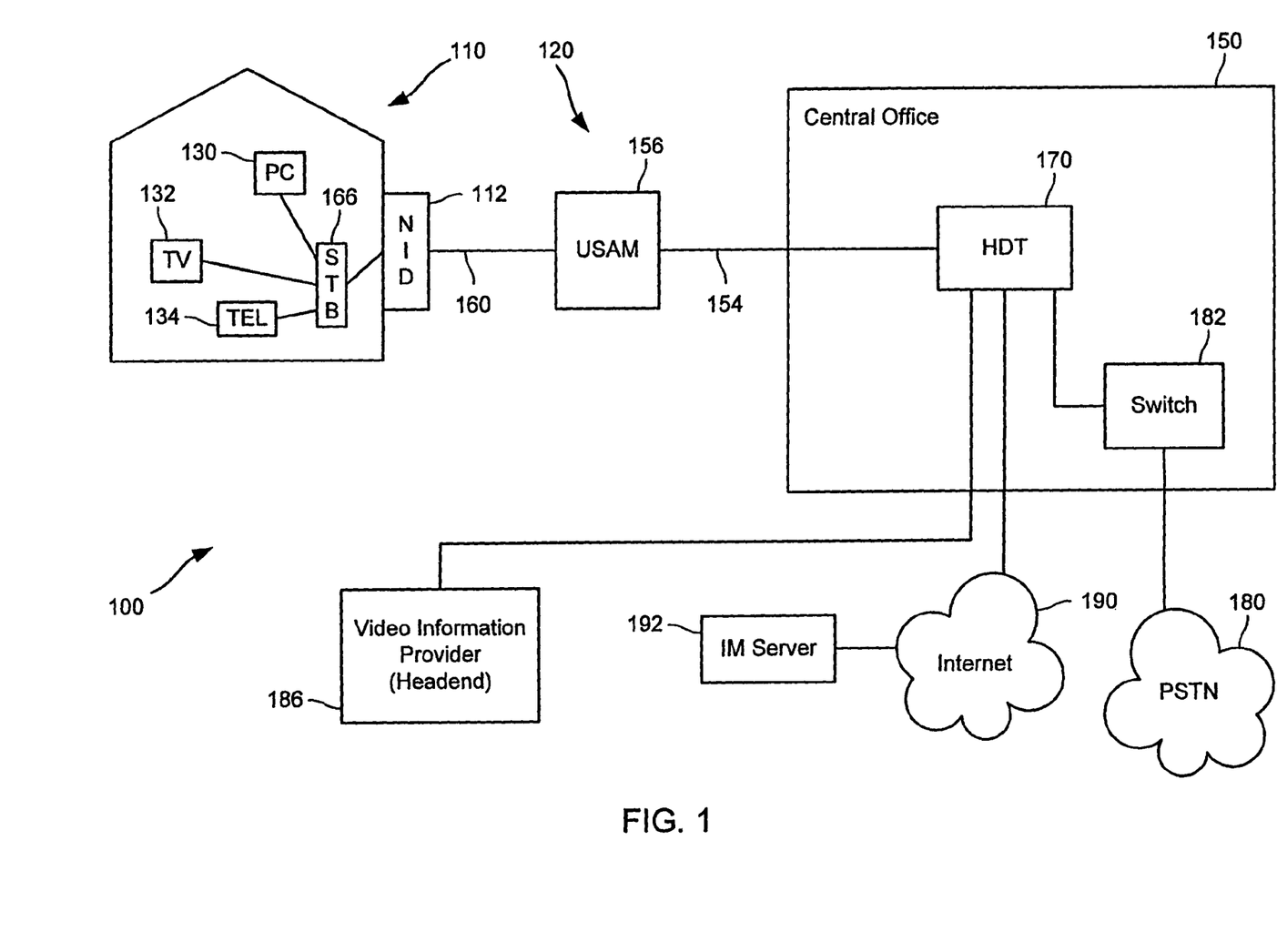
FIG. 1 is a simplified view of a network in accordance with one embodiment of the present invention.

There are various configurations and embodiments implementing the present invention. One such implementation is shown in FIG. 1, where a communications network 100 has a subscriber premises 110 connected by a network interface device (NID) 112 to a service provider network 120. The NID 112 serves as demarcation point and interface between a twisted pair drop cable 160 and the twisted pair and other wiring (and equipment) within the subscriber premises. In the embodiment illustrated, the subscriber receives VDSL (Very high data rate Digital Subscriber Line) services from the service provider, whereby the subscriber is provided internet access at a personal computer 130, receives video programming (such as video-on-demand) and other information for display at a television 132, and has telephone or voice service at one or more telephones 134.

The network illustrated is a fiber-to-the-neighborhood (FTTN) distribution system, with a central office 150 having optical fiber lines 154 (e.g., OC-3 to OC-12c) extending to a universal system access multiplexer (USAM) 156, which in turn is connected to the subscriber ND 112 via the twisted pair copper wire 160. The arrangement seen provides a dedicated VDSL loop between the USAM 156 and the subscriber, using an existing POTS or telephone system twisted pair. A residential gateway or set top box (STB) 166 at the subscriber premises provides a connection point (electrical connections, encoding/decoding, multiplexing, etc.) between the network and the various customer devices (e.g., PC 130, TV 132 and telephone 134). While shown as separate components, the ND 112 and the STB 166 could be combined to perform all subscriber interface functions within a single unit.

The fiber optic lines 154 running from the USAM 156 connect to a high bandwidth, host digital terminal (HDT) 170 within the central office 150. The HDT 170 receives various digital signals containing video, data and voice (from various sources—to be described) and combines those as a broadband signal to the subscriber over the twisted pair drop cable 160. Bi-directional connection paths or channels connect to the HDT 170 and carry (1) voice signals to/from the public switched telephone network (PSTN) 180, directly or through a digital telephone switch 182, (2) video signals (and appropriate video command and control signals) to/from a video headend system 186 provided by a video information provider, and (3) data to/from the internet 190. The VDSL network as thus far described is well known, and the various systems, components and interfaces used in implementing such network are available and established by various standards bodies, telecommunications service providers and manufacturers of VDSL equipment.

Using the network 100 (or any other internet access network and service) for accessing the internet obviously connects the subscriber to a vast network of information providers and their servers, and one such server—an instant messaging (M) server 192—is shown in order to further illustrate various embodiments of the present invention. The IM server 192 is of the type operated by any one of many commercial instant messaging service providers, such as AOL®, Yahoo!® and MSN® (AOL is a registered trademark of American Online Inc., Dulles, Va., Yahoo is a registered trademark of Yahoo! Inc. of Sunnyvale, Calif., and MSN is a registered trademark of Microsoft Corporation, Redman, Wash.), and works in conjunction with the subscriber's equipment to permit receiving, displaying and sending instant messages among subscribers that have, for example, formed a "buddy list" for such purpose (a "buddy list" is a list or group of users that have collectively selected each other, and that communicate with each other within that group via instant messaging).

Before leaving FIG. 1, it should be noted that in one embodiment of the invention, the television 132 at the subscriber premises 110 will be used to display not only video programming content delivered over the communications network 100 to the subscriber (originating from headend 186), but also to display instant messaging content using applications, information and services provided by the IM server 192.

Figure 2:
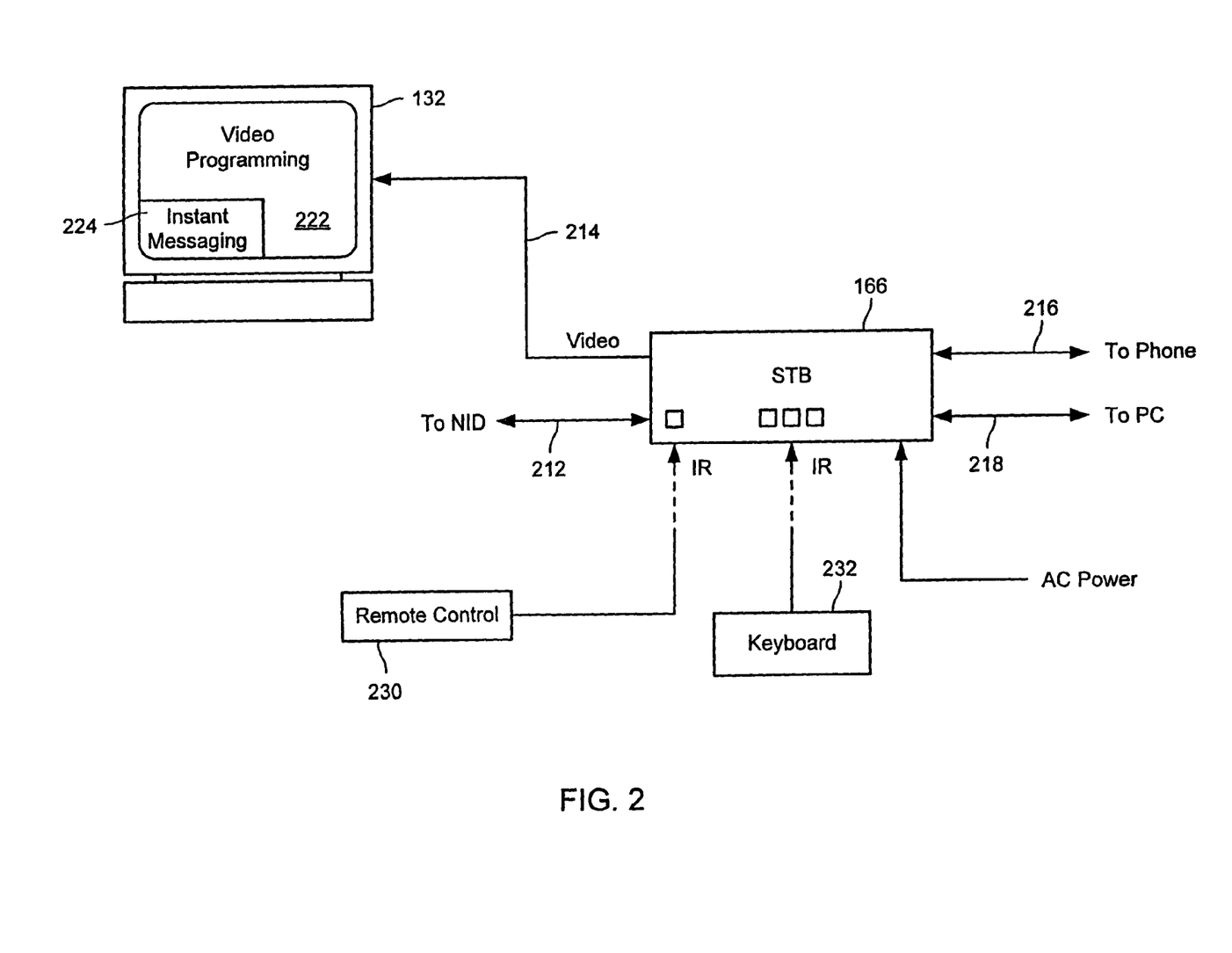
FIG. 2 illustrates a portion of the network seen in FIG. 1.

Turning now to FIG. 2, there is shown in greater detail the equipment within the subscriber premises 110 that may be used in implementing one embodiment of the present invention. In particular, there is shown the set top box (STB) 166, receiving broadband signals from a twisted pair line 212 coming from the NID 112 (FIG. 1). As mentioned earlier, the signals passing through the NID (provided over the twisted pair drop cable or line 160 from the USAM 156—see FIG. 1) contain voice, video and data originating from any one or all of the PSTN 180, internet 190, and video headend system 186. The relevant functions within STB 166 will be described later, but briefly video, data and voice signals present in the broadband signals on line 212 are separated. Video (and companion audio) signals are usually received in an encoded format (e.g., MPEG-2) from the line 212, and are converted by the STB to an analog or other format suitable for a conventional television set and provided over line 214 to the TV 132. Voice signals are provided to telephone equipment over a telephone (bi-directional) line 216, and data signals are provided over a bi-directional line 218 to one or more personal computers. The STB 166 is powered by a suitable power source, such as household AC power.

The TV 132 has a display screen (CRT, LCD, etc.), with the display operated to include a primary window 222 for displaying video programming content (originating from the video headend 186), and a smaller, secondary window 224 for displaying instant messaging screens. As will be described later, the STB 166 acts as a client (having its own processor and memory), running a java-capable or other suitable browser that is programmed to use an instant messaging application or applet downloaded from the IM server 192. Thus for instant messaging functions programmed into the STB processor, including sending, receiving and displaying instant messages and related content, the STB will communicate with the IM server 192 to perform such instant messaging functions, and the instant messaging screens used for such functions are displayed on the secondary window 224 and overlay the video programming on the primary window 222 of the TV 132.

The size, shape and format of the windows 222 and 224 may change to suit the preferences of the user. While FIG. 2 shows them as overlapping, it should be appreciated that for ease of viewing, the secondary window could have a vertical or horizontal shape on one side of the display screen, so that the primary window 222 can be resized when secondary window 224 appears (in order for the video programming on the primary window to not be obstructed by the secondary window).

It should be noted that the PC 130 receiving data signals over line 218 may also have an instant messaging application applet downloaded from the same or a different IM server 192. However, such instant messaging functions and the corresponding screens are displayed at the PC 130 rather than the TV 132. The STB 166 may include a conventional router function that recognizes the IP addresses appended to messages received at the line 212 (and originating over the internet), and routes those messages to the client within the STB when they are addressed to the instant messaging application running within the STB, for ultimate display of instant messaging screens at the TV 132. Of course, IP addresses appended to messages intended for the PC 130 (whether as part of an instant messaging application or any other application on the PC) are routed by the STB to the PC over line 218. While not specifically illustrated, it should be appreciated that the STB as a client may also run applications other than instant messaging applications, and such applications or applets may also have information displayed at the TV 132.

The STB 166 works with two user interface devices, a remote control 230 and a wireless keyboard 232. Both remote control 230 and wireless keyboard 232 may use conventional infra red techniques to communicate with the STB 166. The remote control 230 may have conventional controls or buttons for controlling the operation of the TV 132 for viewing television programming. The keyboard 232 may likewise be a conventional device for controlling the client in the STB, in order to enter data and otherwise interact with any application controlling the secondary window 224 on the TV, which as mentioned earlier, may be used to display instant messaging content. While the remote control and keyboard are shown as separate devices herein, it will be appreciated that they could in fact be integrated into a single device for both controlling televisions programming and entering data. While not illustrated, other user interface devices (e.g., a mouse, roller ball, etc.) could also be used for controlling the STB 166.

Figure 3:
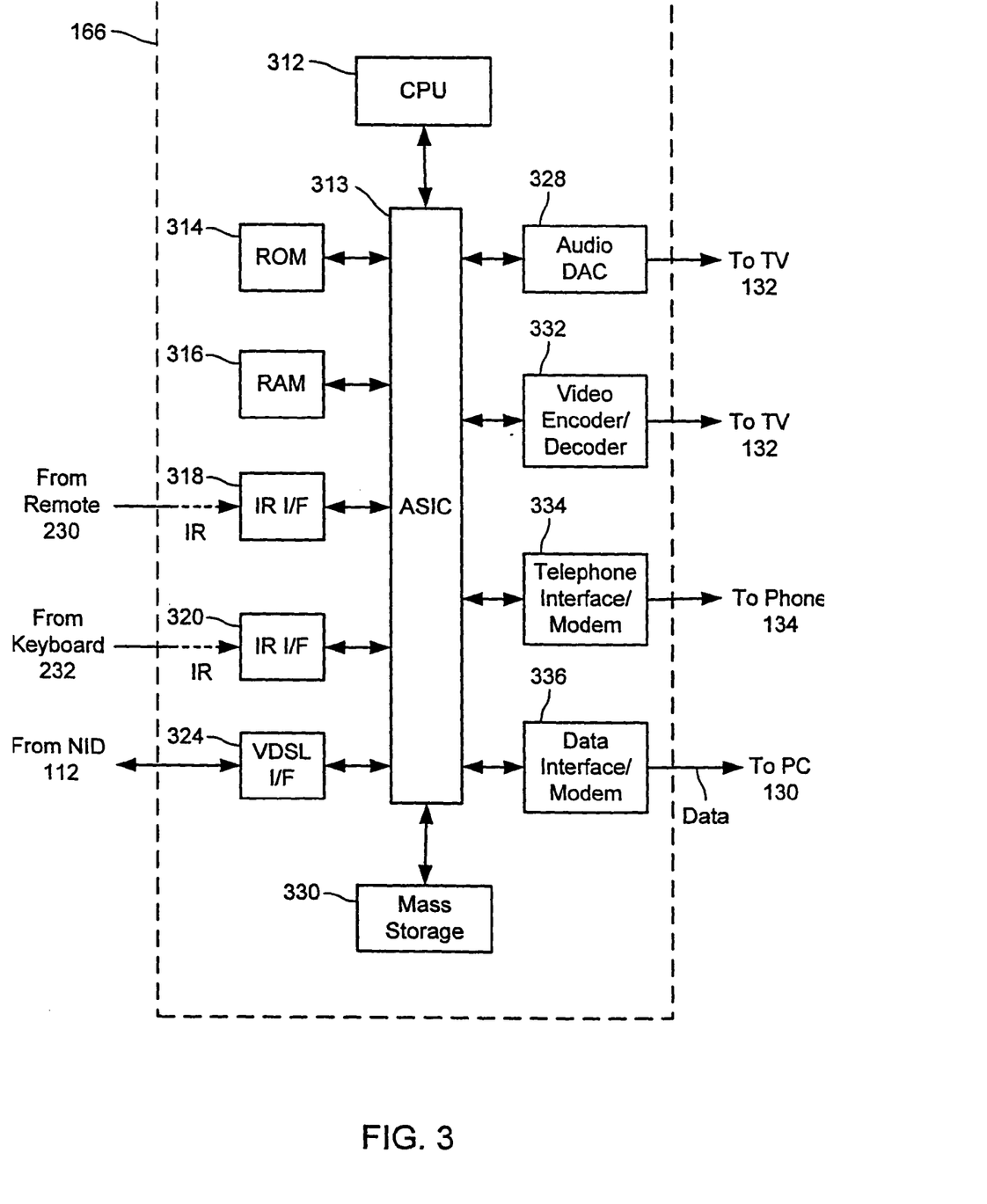
FIG. 3 is a block diagram illustrating the components of the set top box (STB) seen in FIG. 2.

The internal features of the set top box 166 are illustrated in FIG. 3. In this example, the STB 166 is controlled by a central processing unit (CPU) 312, which is coupled to an Application-Specific Integrated Circuit (ASIC) 313. The CPU executes software designed to implement various functionality performed at the STB, in conjunction with the ASIC 313 and other components. The ASIC 313 also operates in conjunction with the CPU 312 to interconnect various components to the CPU and operate the TV 132 in a well known manner. Connected to the ASIC are memory devices, such as a ROM 314 (e.g., for storing code used by the CPU), a RAM 316 (e.g., for storing digitized TV signals so that they can be processed by the CPU 312 before viewing, in order to provide, among other things, shared or split screen viewing), IR interfaces 318 and 320 for the remote control 230 and wireless keyboard 232, respectively, and a VDSL interface 324 for receiving VSDL signals from the NID 112. A mass storage device 330 may be used for storing data and applications, and can be any suitable medium for storing machine executable instructions and data, such as magnetic disks, optical disks, and the like. Also within the STB 166 are an audio digital-to-analog converter (DAC) 328 which provides audio output to the TV 132, a video encoder/decoder 332 which provides video output to the TV 132, a telephone interface or modem 334 for passing voice signals to/from the telephone 134, and a data interface or modem 336 for passing data signals to/from the PC 130. As should be appreciated, the telephone interface 334 may have multiple telephone ports, in order to accommodate multiple phone lines (each with a different phone number) within the subscriber premises, as well as the ability to connect several telephones to a single port (for multiple telephones/extensions sharing a single phone line). Furthermore, the data interface 336 may have multiple data ports in order to permit connection of more than one PC 130 to the STB 166.

The CPU 312 runs a java capable browser stored in the memory of the STB in order to download an instant messaging application. The instant messaging application may be used by the subscriber to display instant messages and related content from other instant message subscribers, such content displayed in one embodiment on the secondary window of TV 132. However, before displaying the content, it is necessary for each user to establish a profile. Such profiles are set up in a well-known manner to those familiar with instant messaging, by entering personal data (e.g., via keyboard 232) pertaining to the user. However, in accordance with one embodiment of the present invention, certain profile data is established to enable users to communicate in a manner augmenting the conventional entry and display of data on an instant message screen. In particular, users will enter telephone number information so that while communicating with other users on the subscriber's "buddy" list, the user can initiate a telephone call to discuss the content of their instant messages. This entry can be done in advance of posting the instant messages, e.g., when setting up a user profile at the IM server 192. The manner of entering telephone information is illustrated in FIG. 4, where a profile screen is illustrated for setting up or joining an instant messaging group or "buddy list", or otherwise permitting one to establish himself as an IM user.

Figure 4:
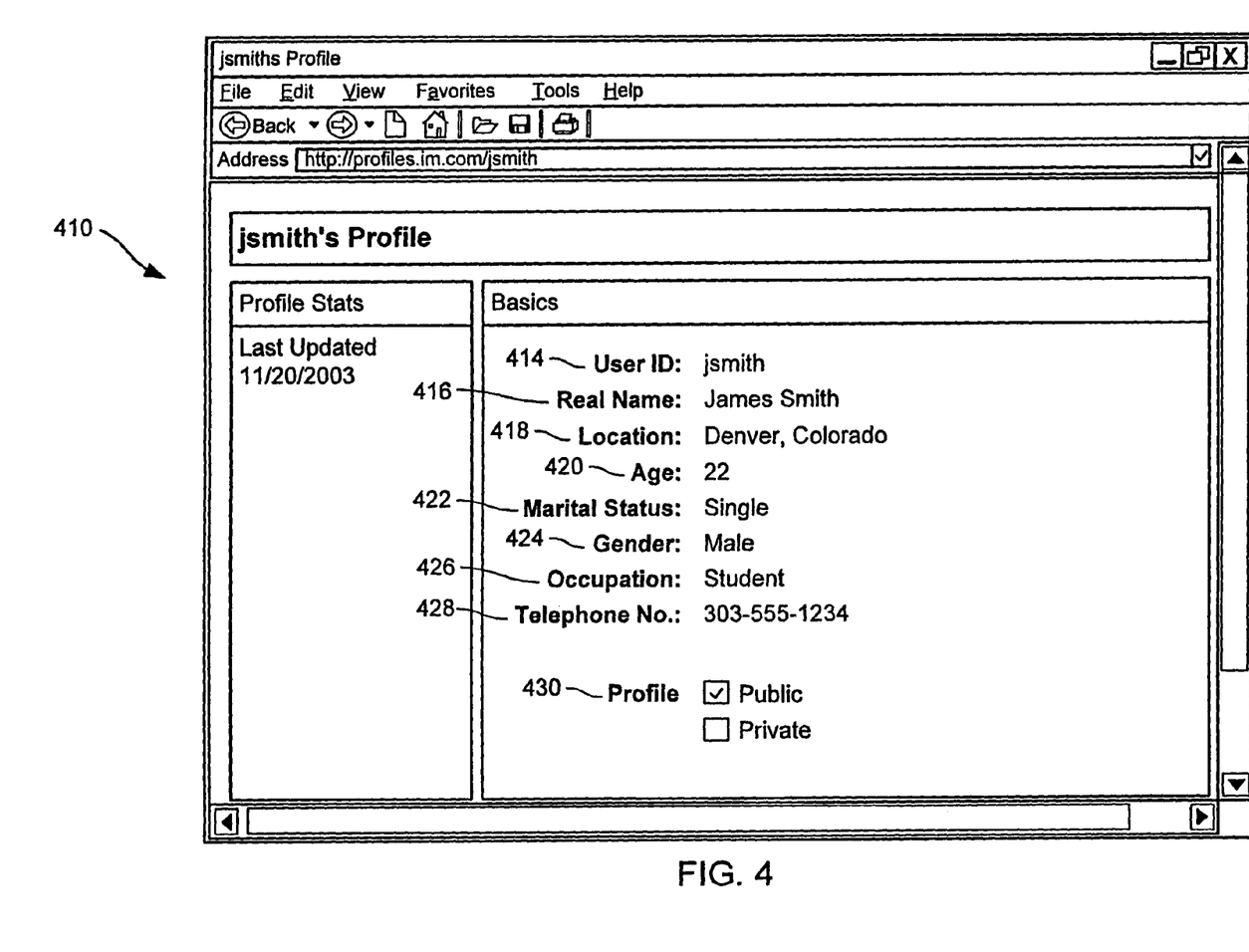
FIGS. 4 through 6 illustrate various screen displays seen on a TV screen as part of an instant messaging (IM) application, and implementing one embodiment of the invention.

Turning to FIG. 4, there is shown a screen 410 for entering the personal profile information of an IM user (i.e., a person who desires to send or receive email within an IM application). As can be seen, the screen includes fields for entering information on the user, including a "User ID" field 414 (the ID displayed with an instant message), "Real Name" field 416 (the actual real name of the user), "Location" field 418 (a city name or other geographical information concerning the user), "Age" field 420, "Marital Status" field 422, "Gender" field 424 and "Occupation" field 426. The forgoing fields are those commonly used by people to establish themselves as users within an IM application and make themselves available to be added to "buddy lists" set up by that user or others (additional or alternative fields could, of course, be employed depending on how the N application will be used). As illustrated in FIG. 4, the profiled user has provided a User ID of "jsmith", having a Real Name "James Smith", living in Denver, Colo., and being a 22 year old, single, male student.

The information in the profile (or portions of it) can be designated as "public", that is, revealed to all other users in order for them to decide if they want the profiled user included in their buddy list, and to organizations such as commercial entities that may use the profile information (and other collected data—to be described) for commercial purposes. Alternatively, the information (or portions of it) may be designated as private, meaning that it is made available only to the user setting up the profile, or to others that the user has selected.

In one embodiment of the invention, the profile screen 410 includes a "Telephone No." field 428 and a "Profile Public/Private" field 430. The "Telephone No." field 428 permits the user to enter and the IM server to store the personal telephone number of the profiled user (standard 10 digits—North American Numbering Plan), and ultimately permits other users to telephone the profiled user during an instant messaging session (as will be described in greater detail later). The "Profile Public/Private" field 430 permits the profiled user to designate his/her information as public or private (in the illustrated screen of FIG. 4, the user has designated his information as public).

It should be appreciated that the STB 166 may store and manage multiple profiles so that each household member at the subscriber premises my separately use the IM application with his/her own profile and preferences. A screen (not shown) may be initially presented for each user to identify (using keyboard 232) himself and thereby use his profile and preferences. The STB may also be programmed to default to one user if he/she is the principal user of the IM application.

Figure 5:
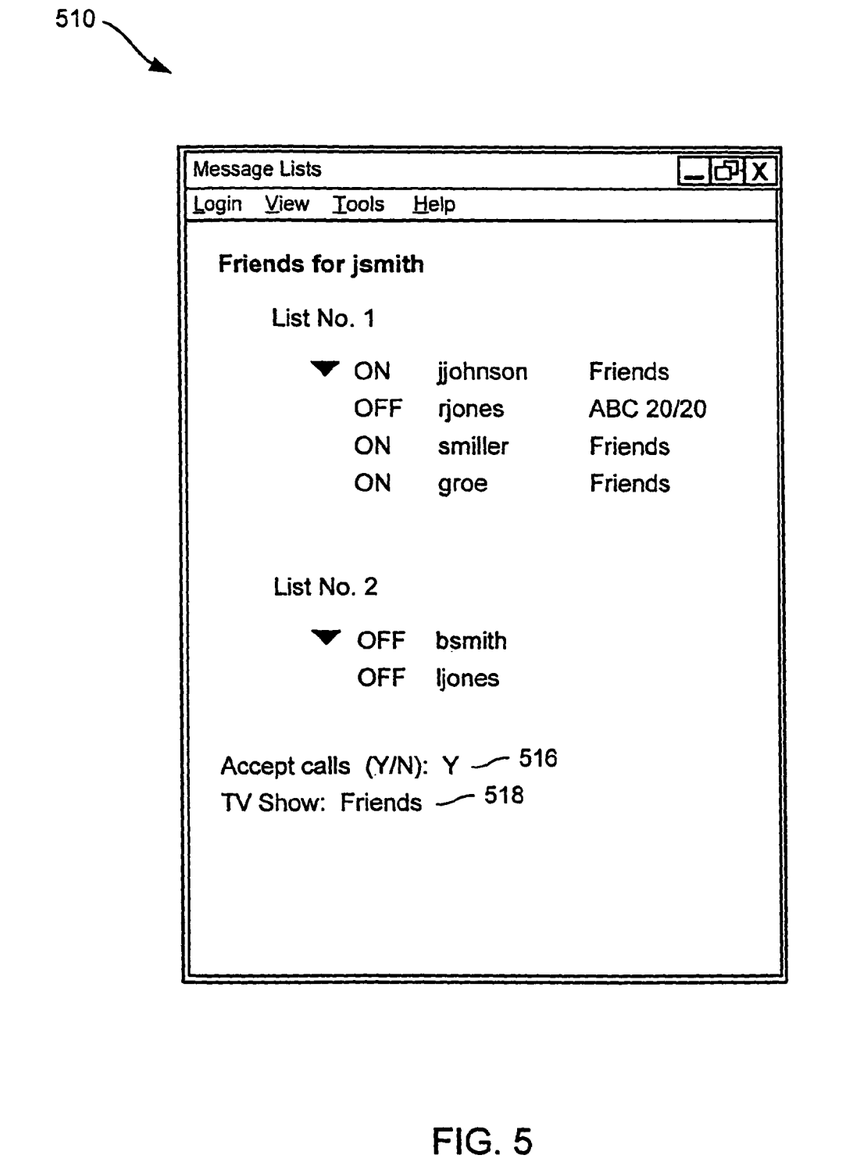

FIG. 5 illustrates a session set up screen 510 used by a user when setting up an instant message session with people on his/her buddy list. As illustrated, the user having the ID "jsmith" has two buddy lists, "List No. 1 and "List No. 2". List No. 1 is illustrated as having four other users who are part of the list, and List No. 2 has two other users. Either list can be selected or clicked to permit "jsmith" to log on or join that instant messaging or chat session (as seen in FIG. 5, List No. 1 has three of its members logged "on" and one logged "off", and List No. 2 had both of its members logged "off"). In addition to identifying each user, screen 510 displays the TV program (if any) being currently viewed by that user.

As also illustrated in FIG. 5, the screen 510 has two fields for implementing certain embodiments of the present invention. An "Accept Calls" field 516 permits the user to either accept telephone calls from other users on the selected buddy list, or not accept those calls. A "TV Show" field 518 permits the user to enter the name of the TV show or program that he is watching while he is present in the IM session. In the embodiment shown in FIG. 2, the TV program may be the program displayed on the primary window 222 of the TV 132, while screens from the instant messaging application are displayed on the secondary window 224 of the TV 132. (While not shown, screen 510 could be pre-programmed to list TV programs or channels, so that the user may select the one being watched.) Various examples of using the TV programming identification will be described shortly in conjunction with FIG. 6.

It should be mentioned that while the embodiments of the invention described in connection with FIG. 5 are illustrated with the user entering the name of TV programming in field 518, alternatively such programming information could be captured electronically at the STB 166. That is, the STB 166 will receive programming ID information along with the actual programming content, as part of the standard MPEG-2 formatted signals from the video headend 186 (FIG. 1), and if an IM application (implementing the present invention) is running at the same time on the CPU 312 within the STB 166, such programming identification can be captured and stored automatically by the IM application. This arrangement, of course, permits the IM application to recognize a change in the programming content or channel (such as a result of the user changing TV channels) that may occur during the IM session, and dynamically change the displayed TV programs ID without the user having to return to screen 510 and manually change the TV program ID or name.

Figure 6:
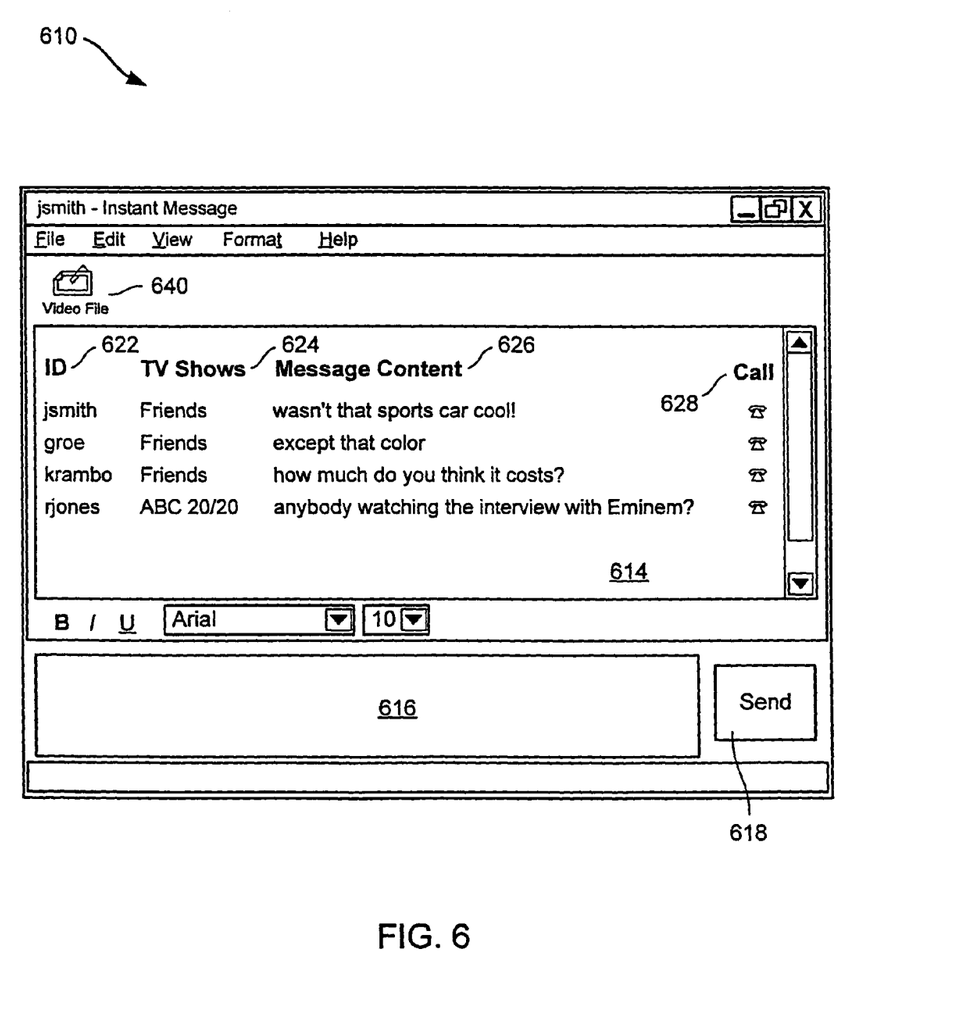

Turning now to FIG. 6, there is illustrated a message display screen 610 that is displayed after a buddy list has been selected by the user (in the screen illustrated in FIG. 6, the screen illustrates messages from all the users who are part of "List No. 1" in FIG. 5, and each of those users sees the same screen format). The message display screen 610 will appear in the secondary window 224 of TV 132. The message display screen, has two windows or subscreens, a sent/posted message subscreen 614 for displaying all messages that have been sent by all of the users, and a message composition subscreen 616 that is used in order to compose messages before they are sent (by selecting a "Send" button 618) to all the other users. As seen in FIG. 6, each message has four components, namely an "ID" component 622 displaying the ID of the message sender, a "TV Show" component 624 displaying the name of the television program that the sender is watching (entered for example, at screen 510 in FIG. 5), a "Message Content" component 626 showing the actual content of the sent message, and a "Call" component 628 having for each message a telephone icon or button (graphical element) that can be selected to permit the user viewing the screen to telephone the sender of that message (assuming that the sender has decided to accept calls at field 516 in FIG. 5). As conventional, attachments (text, audio, video) can be included with a message and, although not illustrated in FIG. 6, an attachment icon can be displayed with the message to indicate the presence of the attachment.

The screen 610 also has a Send Video File button 640 for sending a video file attachment to any message composed at subscreen 616 (the details of such attachment will be described later).

Thus, it can be appreciated that the user of the IM application implemented by the screens of FIGS. 4, 5 and 6 is not only able to see messages from other users on his/her buddy list, but also see which TV program each user is watching. This facilitates "real time" conversation (via email messages) concerning the TV program as part of the instant messaging session. Further, the user can select the "Call" button at any message in order to initiate a telephone call to the sender of that message so that, among other things, the user selecting the "Call" button and the sender of the message being called, may also have a "real time" voice conversation about the particular TV show being watched (as well as any other subject) at the same time as they are each viewing the message display screen 610 in FIG. 6.

It should be further appreciated that other embodiments may use variations of the screens seen in FIGS. 4, 5 and 6. As one example, rather than a chat session involving a group of users from a predefined buddy list, a user may be messaging only one (or a few) individual users (that are not part of a buddy list). While the screen 610 in FIG. 6 might, in such instance, show only one other user and his/her messages, the screen 510 in FIG. 5 can be selected for simultaneous display so that the user may still monitor (separately) other users in the buddy list(s), their status ("on"/"off"), and which TV show they are each watching. While not illustrated in FIG. 5, the screen 510 could also include a call button (similar to call button 628 in FIG. 6) so that a call can be initiated to any other person on the buddy list using screen 510, even if such person is not part of an active instant messaging session (screen 610).

Figure 7:
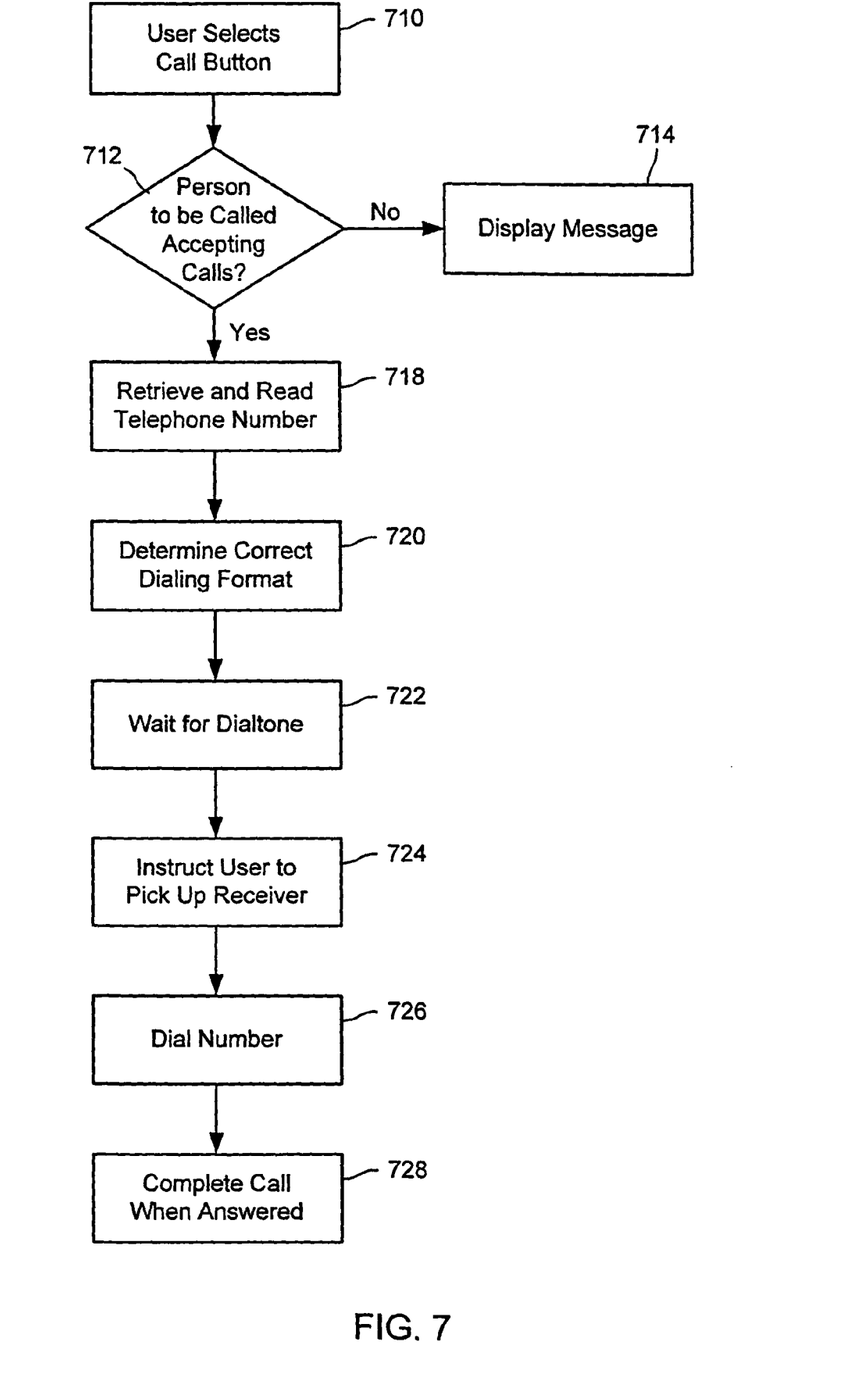
FIG. 7 is a flow diagram illustrating a program process carried out within the STB seen in FIG. 3, in order for an IM user to make a telephone call to another IM user.

Turning to FIG. 7, there is shown a flow diagram illustrating the process and associated program steps (implemented within STB 166) for making a telephone call by selecting the Call button 628 seen in FIG. 6. After the Call button has been selected at step 710, the IM application running within STB 166 checks profile information of the selected user (which has been downloaded by the IM Server 192 into memory within the STB) to determine (step 712) whether the person to be called is accepting telephone calls (such information was entered at field 516, screen 510 in FIG. 5, when that person joined the IM session). If the person is not accepting calls, a message to that effect (not shown) is displayed on the TV 132, at step 714. If the person is accepting calls, then the IM application at step 718 reads the telephone number stored with the profile information within the STB memory (such number was initially entered when the person set up his/her profile at screen 410 seen in FIG. 4). The IM application then determines the correct dialing format of the telephone number to be called, step 720. This last mentioned step is necessary because the actual number to be dialed may have a format different than the format entered at screen 410.

This last mentioned step 720 may involve one or more subprocesses, depending on the nature of the number stored for the person being called. For example, all numbers are entered in a ten digit format as seen at screen 410 (three digit area code plus seven digit phone number). Two lookup tables within the STB can be used to determine the proper dialing format needed to make the call. As an example, lets assume the person being called lives in the same area code, and a seven digit number (without area code) is used to make the call. The STB will be programmed to convert the telephone number stored (ten digits) to seven digits by dropping the area code before dialing the number. Similarly, if the call is a long distance call, requiring that a "1" precede the ten digit number when dialed, the STB is programmed to include the "1" in the dialed number. The following Table 1 illustrates several different algorithms stored in STB 166 and that can be used to convert the stored telephone number into an appropriately formatted number for dialing:

TABLE 1

| Algorithm Index | Algorithm Name | Algorithm Description |
|---|---|---|
| 0 | 1 + 10D | Dial out 1 followed by the last 10 digits |
| 1 | 7D | Dial out the last 7 digits |
| 2 | 10D | Dial out the last 10 digits |
| 3 | 1 + 7D | Dial out 1 followed by the last 7 digits |
| 4 | 5D | Dial out the last 5 digits |

Further, the following Table 2 illustrates an excerpted portion of a look-up-table that can also be stored in the STB 166 for determining which of the algorithms (such as those in Table 1) should be used to dial the called number:

TABLE 2

| Area Code | Algorithm Index |
|---|---|
| * | * |
| * | * |
| * | * |
| 201 | 0 |
| 202 | 0 |
| 203 | 0 |
| 204 | 3 |
| 205 | 2 |
| 206 | 0 |
| 207 | 0 |
| 208 | 0 |
| 209 | 0 |
| 210 | 0 |
| 301 | 0 |
| 302 | 0 |
| 303 | 1 |
| * | * |
| * | * |
| * | * |

Thus, based on the area code of the number to be dialed, the STB 166 will use the stored ten digit phone number, and reformat as necessary to complete the call over the PSTN 180.

A more complete description of a system and apparatus for properly formatting a dialed number from a stored telephone number (e.g., when the stored number is in a ten digit format), can be found in U.S. Pat. No. 6,597,785, entitled "Automatic Caller ID Call Log Dial Back", issued to Burke et al on Jul. 22, 2003, which is hereby incorporated by reference.

After the correct dialing number is determined, the STB 166 waits for a dial tone (step 722) at the telephone connected to the STB and that the user will use to make the phone call (most likely in close proximity to TV 132). For example, if there are several phones (extensions) throughout the subscriber premises, and someone other than the user is using one of the other telephones within the premises, the STB may be programmed to display a message at the TV indicating that the line is busy or that no dial tone is available. The STB can also tell the user through the display that the number will be dialed when the phone line becomes available (the user can decide whether to wait or cancel the call request).

After a dial tone is detected at step 722, the user is instructed (by display at the TV), to pick up the telephone, step 724. Once the STB detects that the telephone receiver has been picked up, the STB dials the correctly formatted number (step 726), and when the telephone receiver at the called location is picked up, the call is completed (step 728) and the user at the dialing location and the user at the called location may then have a telephone conversation (which in the illustrated embodiment is carried over the PSTN 180).

It should be noted that the forgoing feature for calling a sender of an email message could be implemented in many other ways. For example, if the central office switch 182 (FIG. 1) implements AIN (Advanced intelligent Network) functionality, the STB 166 could dial the telephone number of the user to be called, and the switch 182 could call back the calling user as soon as that call can be completed. Further, the telephone call could be made using IP telephony (using the internet), and the switch 182 could be bypassed altogether.

Figure 8:
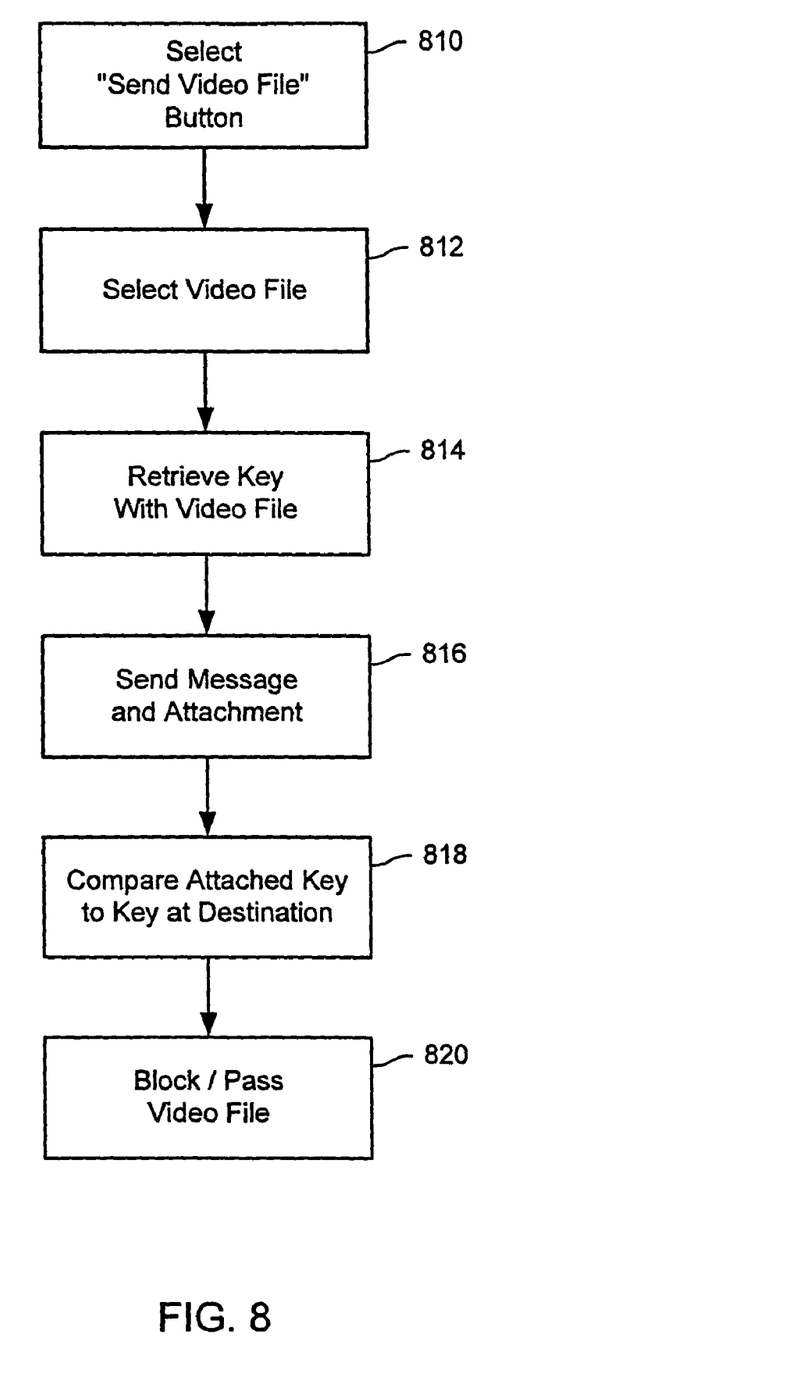
FIG. 8 is a flow diagram illustrating a program process carried out within the STB for sending a video file from one IM user to another.

FIG. 8 is a flow diagram illustrating the process flow and associated program steps by which the IM user at the subscriber premises 110 may provide a video file to another IM user. FIG. 8 will be described in conjunction with FIGS. 9 and 10, which illustrate functional features within STB 166 used in encrypting and decrypting video files and keys as part of the process of FIG. 8. In FIG. 8, the user first selects (step 810) the Send Video File button 640 seen in FIG. 6. In one embodiment, the user may merely select (step 812) from video files that have previously been stored by the IM user within the memory of the STB 166. Such files are stored in an appropriate format, such as MPEG-2. However, the user may also select a file to be created or that is currently being created, such as a file or video clip of the program that the user is currently watching at TV 132. Systems and services for storing video programming currently being viewed or broadcast are those marketed by TiVo (TiVo is a registered trademark of TiVo, Inc., Alviso, Calif.). Such a system is described in U.S. Pat. No. 6,233,389, entitled Multimedia Time Warping System, issued to Barton et al. on May 15, 2002, which is hereby incorporated by reference. If such a system were employed, TV programming currently being viewed at TV 132 is simultaneously being stored in memory, and the user sending the attachment could identify a TV show or portion thereof that might appeal to another user as he or she is watching it, and use the stored file of the TV program as an attachment to an instant message created as the TV program is still being watched.

It should be appreciated that depending on the source, the video file to be shared may be stored in a proprietary format (e.g., other than MPEG-2) at the STB 166. For example, if the file is created using the previously mentioned TiVo system, such file would be in a TiVo proprietary format and may be stored at the STB in that proprietary format. The file may be re-formatted (to MPEG-2) by the STB when shared with others, or shared (sent to another IM user) in the stored proprietary format if the destination STB is programmed to use that proprietary format.

After the user has selected a video file, the STB may also attach (step 814) an encryption key associated with that TV program file. This is particularly useful if the TV program is broadcast on a premium channel (the user has paid a subscription fee for viewing at TV 132), and the program has been encrypted using well know encryption techniques to prevent unauthorized viewing.

Figure 9:
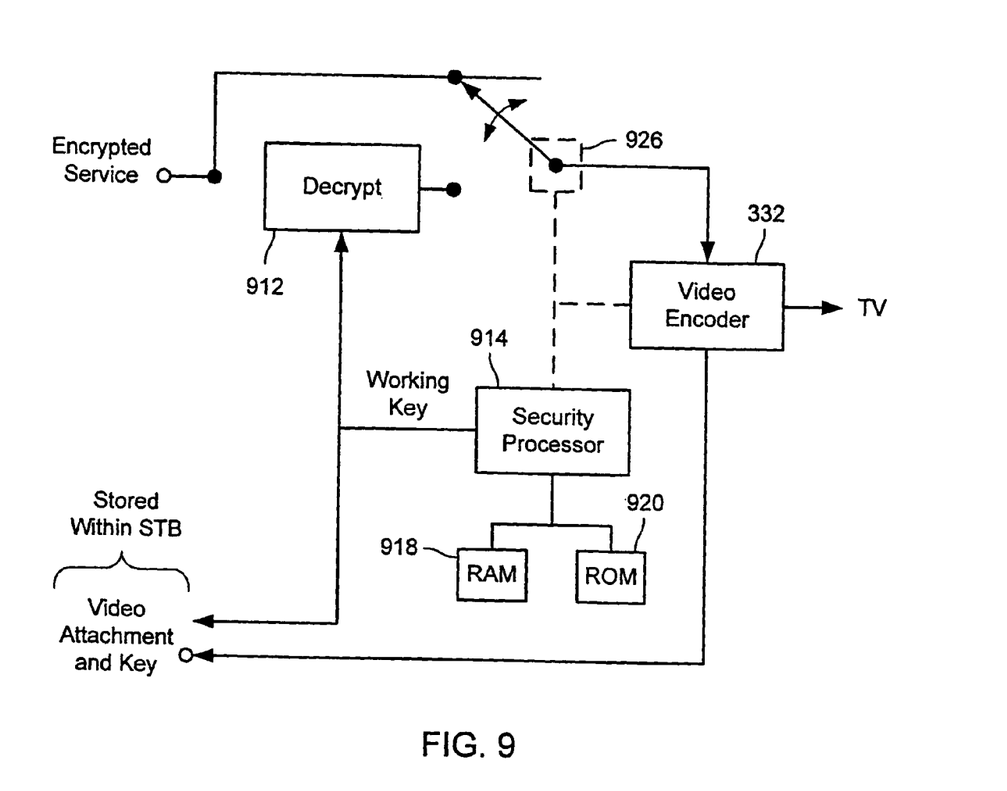
FIGS. 9 and 10 illustrate functionality within the STB of an IM user for decrypting video program signals, and providing a key for use with a video file attachment that is to be sent to another IM user.
Figure 10:
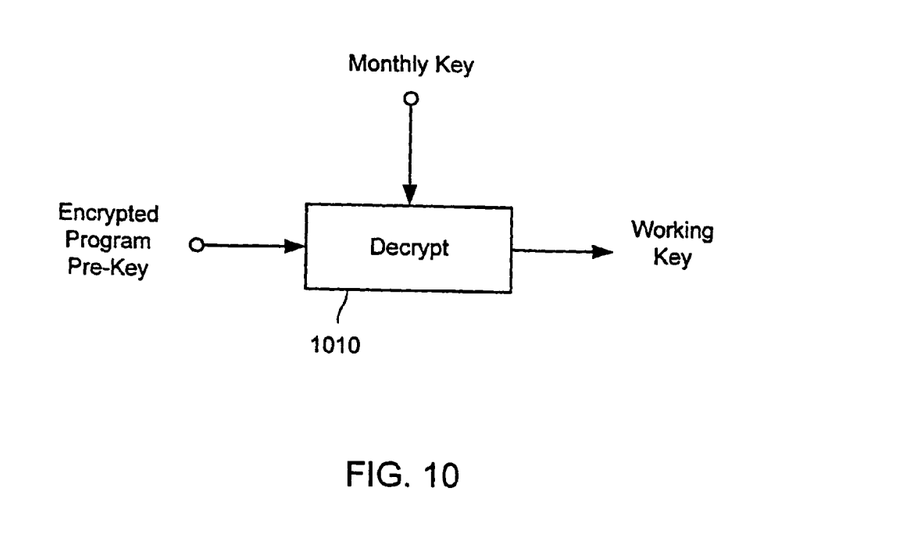

In order to more completely understand this last mentioned feature of the described embodiment (implemented at step 814), reference can be made to FIG. 9, which illustrates the use of encryption for TV programming as could be implemented by the CPU 312 and other functionality within STB 166. As can be seen, the encryption/decryption functionality within the STB 166 includes a decryption function 912 for receiving an encrypted program or service, and providing the program in a decrypted format at its output, through the use of a working key provided by a security processor 914. The security processor 914 is connected to memory (RAM 918 and ROM 920). The memory stores both an encrypted pre-key that is provided by the service provider when the user subscribes to the service, and a monthly key that is provided by the service provider (changed each month to make it difficult to obtain unauthorized access to the program). As illustrated in FIG. 10, the STB 166 uses the pre-key to decrypt (block 1010) the monthly key, resulting in a working key that is provided to the programming decryption function 912 (FIG. 9) in order to decrypt the programming signal. The security processor 914 controls a switch 926, so that if the user has the appropriate pre-key and monthly key, the decrypted programming is provided by switch 926 to TV 132 via the video encoder/decoder 332 (previously discussed in conjunction with FIG. 3). If the user is not authorized, the switch 926 provides encrypted programming (scrambled so as to not be viewable) to TV 132.

The encryption/decryption techniques described are well known, and techniques other than those described could be employed. A more detailed description of the functionality seen in FIGS. 9 and 10 is found in U.S. Pat. No. 5,594,794, issued to Eyer et al. on Jan. 14, 1997, which is hereby incorporated by reference.

As seen in FIG. 9, the video provided to TV 132 is also outputted as a file (MPEG-2 format) to be stored within the STB 166. Such file can be accessed and then sent to another user as an video file attached to an instant message (step 812, FIG. 8). Further, as also seen in FIG. 9, the security processor 914 also supplies the working key so that it can be stored with the video file, for reasons to be explained shortly.

Returning to FIG. 8, the IM user wanting to attach a video file then sends the message with the selected video file (which is now decrypted, but includes the working key associated with that video file), step 816. When the message and attachment are received at the intended destination (i.e., one of the other users on the "buddy list"), the STB 166 at that destination stores the video file, and compares the working key (sent with the message) to a working key generated at that STB, step 818. In particular, if the destination user has subscribed to the same premium channel, that STB at the destination takes the program pre-key and monthly key stored at that location for viewing encrypted programming, and derives a working key (see FIG. 10), and compares that working key to the working key sent with the video file. It should be noted that the destination user may subscribe to more than one premium channel or pay-per-view channel, it which case a comparison is made of the working key generated for each such channel to the working key sent with the attachment. At step 820, if a match is made, the video file is passed to the TV connected to the STB at that location; if there is no match, the video file is blocked at that location from being displayed.

It is noteworthy that the use of a working key as the key or code to permit viewing is but one example of a process for assuring that the destination user is authorized to view the video file. Requiring that the destination decrypt a monthly key to yield a working key assures that the destination has both a monthly key and an encrypted program pre-key. However, in alternative embodiments, the video file could be sent with just the program pre-key, just the monthly key, or with any other key or code, as long as the same key or code will be present (or can be generated) at a destination when that destination is an authorized viewer/location of the channel from which the video file was originally made.

It should be appreciated that the method described above for matching keys at the destination is particularly useful in the context of instant messaging, where the user sending a video or other protected file distributes each message to a group of users (recipients) who happen to be on the "buddy list", and thus where it is difficult or impractical for the user to ask each person whether they are authorized to view programming from a premium (or pay-per-view) channel, and be able to verify that each such recipient is in fact so authorized.

Figure 11:
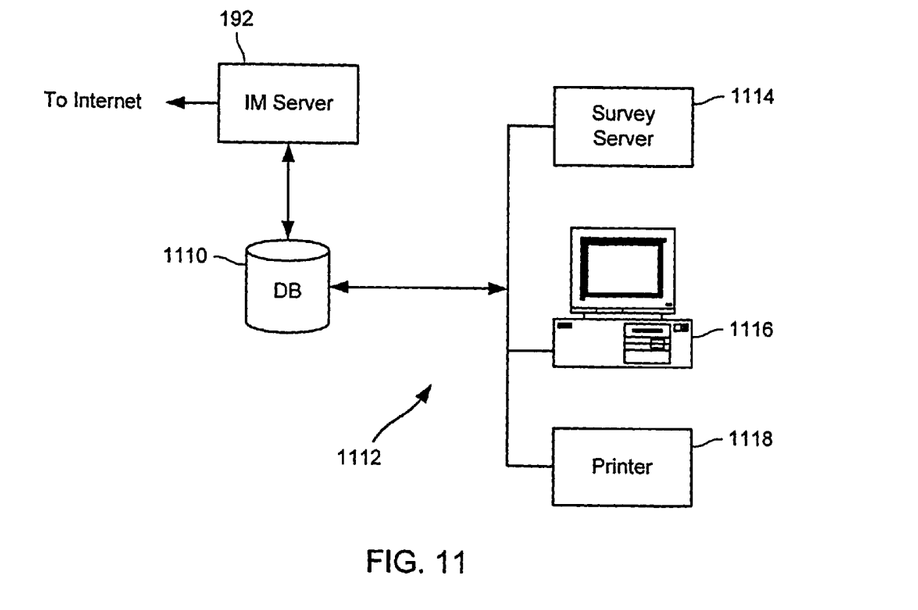
FIG. 11 illustrates a database management system for use with an IM server, in order to collect and report data at the IM server, such data associated with IM users.
Figure 12:
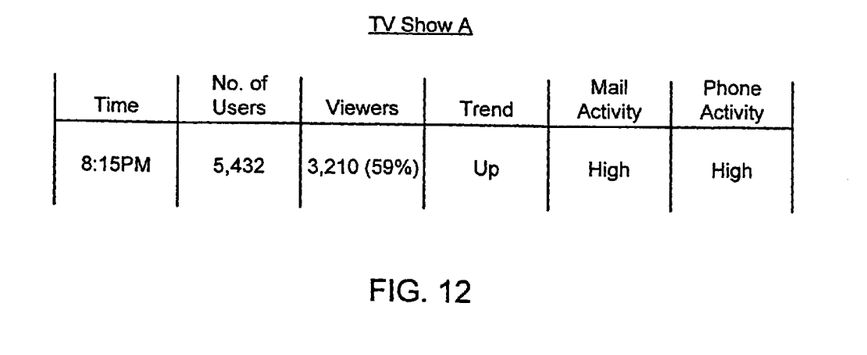
FIG. 12 illustrates a report on IM activity and TV watching habits, that could be generated by the database management system of FIG. 11.

Turning now to FIGS. 11 and 12, there is illustrated an arrangement where the operator of the IM server 192 (or others with access to the IM server) may use data collected during an IM session. In particular, there is seen in FIG. 11 a survey database 1110 connected to the IM server 192. The database 1110 stores data collected or gleaned from the messages being posted by the instant messaging services (and each of the instant messaging sessions) operated through use of the IM server 192. Such data can include the number of users, which TV programs those users are watching (based on the TV programming names or IDs presented with instant messages), key words present in messages, and so forth. The database 1110 is connected to a database or survey system 1112, that includes a survey server 1114 which manages the database 1110, an input/output terminal 1116 for permitting queries and other actions in connection with the data, building database reports, etc., and a printer 1118 for printing database reports, etc.

The types of data that are collected and the reports that can be generated by the database system 1112 are numerous. It should be appreciated that since the data collected relates to instant messaging being posted, TV programs being watched by the IM users, telephone calls being made in association with the messages, and other data associated with the content of those messages, that the data is real time, i.e., reflects instantaneous activity by users. As an example, if a TV programming entity wants to know on an instantaneous basis how audiences are reacting to a broadcast program, the data generated at system 1112 can be used by the survey system operator for such purpose.

An exemplary report in such an instance is shown in FIG. 12, where at a given time (8:15 PM) for a given broadcast program ("TV Show A"), a programming entity can learn how many users are using the IM server 192 (the total survey population), how many of those users are watching Show A, whether over a period of time (say, 5 minutes) the number of viewers is trending up or down (i.e., whether the number of viewers has increased or decreased), and how the TV program is impacting instant mail activity and phone activity (an increase in mail or phone activity by users watching Show A might indicate the degree of interest in the program). In addition, to the extent users have permitted profile data to be used (field 430 in FIG. 4), the survey organization may also learn about the demographics of the users being reported. All of this is real time, of course, with data changing as activity changes, and such instantaneous data capable of being reported as it changes. This permits the survey organization, for example, to note favorable or unfavorable instant messaging activity moment by moment, or scene by scene, as a TV program progresses.

In conclusion, the described embodiments of the invention provide networks, systems and methods implementing various applications, features, and functionality relating to instant messaging and similar services. While the network 100 is described as employing VDSL service, it should be appreciated that other forms of data transmission could be employed. For example, the video programming or signals transmitted to the STB 166 at the subscriber premises (and even the voice and data signals) can be from one or more video sources, such as cable TV, satellite, and other forms of wireline and wireless transmission. Such transmission can be made in conjunction with or separately from the connections/transmissions between the subscriber premises and the central office 150. In such example, if video programming originates from a satellite system, then the NID 112 (in FIG. 1) may receive signals (e.g., voice and data) over drop cable 160 and the STB 166 may also separately receive video programming from a separate line (not shown) carrying video signals from a satellite dish at the subscriber premises.

Furthermore, in other embodiments, the functionality described as resident at the STB 166 (e.g., look up tables for telephone calling, assembling attachments and the corresponding encryption/decryption of video messages and keys) could be provided in part or in whole at the IM server 12 rather than the STB 166.

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A communications network having a plurality of interconnected instant messaging (IM) users, comprising:
   a user interface associated with each user, wherein the user interface is for displaying video programming content and IM content, and wherein at least some of the displayed IM content identifies the displayed video programming content;
   an IM server for managing IM content in the form of IM messages among the interconnected users, the IM server operated by an IM service provider for receiving, displaying and sending IM messages among the users;
   a survey database connected to the IM server for receiving and storing data, the stored data relating to the displayed IM content and separate from the IM messages being received, displayed and sent among the users by the IM server; and
   a survey server separate from the IM server for receiving from the survey database the stored data relating to IM content displayed by the user interface, wherein the survey server may be used to aggregate IM content data and generate reports based on the aggregated IM content data for a survey organization, with the aggregated IM content and the reports separate from the IM content being displayed at each user interface, so that video programming activity by multiple users may be tracked at the survey server based on the aggregated IM content rather than on survey data provided separately by the users;
   wherein the survey server generates a report to be provided to a television programming entity, the report indicating how many IM users are watching a particular broadcast video program at a given point in time, and whether a number of IM users watching the particular broadcast video program is trending up or down.

2. The communications network of claim 1, wherein the user interface comprises a display device and wherein the video programming content and the IM content are displayed at the display device.

3. The communications network of claim 2, wherein the user interface further comprises a set top box for providing video signals to the display device.

4. The communications network of claim 3, wherein the display device comprises a television.

5. The communications network of claim 1, wherein the video programming content and the IM content are displayed simultaneously by the user interface.

6. The communications network of claim 1, wherein the IM content comprises a program ID for identifying the video programming being viewed at a user interface.

7. The communications network of claim 6, wherein the IM content further comprises a personal ID associated with a user of the IM application.

8. The communications network of claim 7, wherein the IM content further comprises a text message.

9. The communications network of claim 1, wherein video programming content is a broadcast television program.

10. The communications network of claim 9, wherein the IM content comprises a program ID identifying the broadcast television program, and a telephone communications display element, the telephone communications display element selectable in order to establish a telephone communications line between two of the interconnected users.

11. The communications network of claim 10, wherein the telephone communications line between the two users is established over the public switched telephone network (PSTN).

12. The communications network of claim 1, wherein the user interface comprises a display device having plural display windows.

13. The communications network of claim 1, wherein at least some of the users are subscribers to VDSL service, and wherein the VDSL service provides telephone, video programming and internet access service to such subscribers over the communications network.

14. The communications network of claim 1, wherein at least some of the users are subscribers to satellite television service, and wherein the video programming content is provided to the user interface by the satellite television service.

15. The communications network of claim 1, wherein at least some of the users are subscribers to cable television service wherein the video programming content is provided to the user interface by the cable television service.

16. In a communications network, a method for surveying users on the network, comprising:
   providing a user interface for each of the users, the user interface including a display device;
   displaying video programming content and instant messaging (IM) content at the display device of each user interface, some of the displayed IM content identifying the displayed video programming content;
   providing an IM server for managing IM content, the IM server operated by an IM service provider for receiving, displaying and sending IM messages among the users;
   providing a survey database for storing data relating to the displayed IM content, the stored data separate from the IM messages being received, displayed and sent among the users by the IM server;
   providing a separate survey server using the survey database for aggregating IM content displayed at the display device of each user interface and for generating reports based on the aggregated IM content for a survey organization, with the aggregated IM content separate from the IM content being displayed at each user interface, so that video programming activity related to aggregated IM content of the users can be tracked real time at the survey server based on the aggregated IM content, thereby permitting capture of IM activity moment-by-moment as video programming content progresses during a video program, based on the aggregated IM content rather than survey data provided separately by the users; and
   generating a report to be provided to a television programming entity, the report indicating how many IM users are watching a particular broadcast video program at a given point in time, and whether a number of IM users watching the particular broadcast video program is trending up or down.

17. The method of claim 16, wherein the IM content comprises a program ID separate from the video programming content, the program ID identifying the video programming being viewed at a user interface.

18. The method of claim 17, wherein the aggregated IM content includes the program ID so that the number of users viewing the identified video programming can be tracked at the survey server.

19. The method of claim 17, wherein the aggregated IM content includes keywords present in messages forming part of the IM content, so that the reaction of users viewing the identified video programming can be tracked.

* * * * *

UNITED STATES PATENT AND TRADEMARK OFFICE
CERTIFICATE OF CORRECTION

| | | |
|---|---|---|
| PATENT NO. | : 7,954,124 B2 | Page 1 of 1 |
| APPLICATION NO. | : 10/853339 | |
| DATED | : May 31, 2011 | |
| INVENTOR(S) | : Rambo | |

It is certified that error appears in the above-identified patent and that said Letters Patent is hereby corrected as shown below:

Title page, Item (73) Assignee, delete "Quest Communications" and insert --Qwest Communications--, therefor.

Title page, Abstract, Line 10, delete "only if the there" and insert --only if there--, therefor.

Title page, Abstract, Line 12, delete "monitor message" and insert --monitor messages,--, therefor.

Column 1, Line 24, delete "the IN application," and insert --the IM application,--, therefor.

Column 2, Line 61, delete "subscriber ND 112" and insert --subscriber NID 112--, therefor.

Column 3, Line 20, delete "such network are" and insert --such networks are--, therefor.

Column 2, Line 20/21, delete "standards bodies" and insert --standard bodies--, therefor.

Column 3, Line 27, delete "messaging (M) server" and insert --messaging (IM) server--, therefor.

Column 6, Line 3, delete "The forgoing fields" and insert --The foregoing fields--, therefor.

Column 6, Line 8, delete "the N application" and insert --the IM application--, therefor.

Column 11, Line 10, delete "user as an video" and insert --user as a video--, therefor.

Column 11, Line 29, delete "channel, it which" and insert --channel, in which--, therefor.

Signed and Sealed this
Twentieth Day of September, 2011

David J. Kappos
*Director of the United States Patent and Trademark Office*